(12) United States Patent
Mehta et al.

(10) Patent No.: US 8,151,698 B2
(45) Date of Patent: Apr. 10, 2012

(54) COOKING BYPRODUCT COLLECTOR

(75) Inventors: Gagan Mehta, Andhra Pradesh (IN); Howard Richard Bowles, Louisville, KY (US); John Adam Yantis, Louisville, KY (US); Jose Hernandez Burgos, Queretaro (MX)

(73) Assignee: General Electric Company, Schenectady, NY (US)

( * ) Notice: Subject to any disclaimer, the term of this patent is extended or adjusted under 35 U.S.C. 154(b) by 679 days.

(21) Appl. No.: 12/342,429

(22) Filed: Dec. 23, 2008

(65) Prior Publication Data

US 2010/0154655 A1   Jun. 24, 2010

(51) Int. Cl.
*A47J 37/06* (2006.01)
*A47J 37/10* (2006.01)

(52) U.S. Cl. ............... 99/425; 99/444; 99/446; D7/402; D7/409

(58) Field of Classification Search .................... 99/375, 99/400, 425, 444–446; D7/402, 409; *A47J 37/10*
See application file for complete search history.

(56) References Cited

U.S. PATENT DOCUMENTS

| | | | | |
|---|---|---|---|---|
| 1,706,612 A | * | 3/1929 | Jaeger | 99/375 |
| 2,175,333 A | * | 10/1939 | Wilson | 99/425 |
| 2,180,868 A | * | 11/1939 | Dunning et al. | 99/444 |
| 2,786,929 A | * | 3/1957 | Michaelis | 99/444 |
| 3,330,204 A | | 7/1967 | Little | |
| 3,714,885 A | | 2/1973 | Wertheimer et al. | |
| 4,512,250 A | * | 4/1985 | Schindler et al. | 99/425 |
| 4,598,634 A | * | 7/1986 | Van Horn, II | 99/425 |
| 4,608,917 A | * | 9/1986 | Faaborg | 99/425 |
| 4,909,137 A | | 3/1990 | Brugnoli | |
| 5,237,914 A | * | 8/1993 | Carstensen | 99/445 |
| 5,678,531 A | | 10/1997 | Byers et al. | |

FOREIGN PATENT DOCUMENTS

WO    WO 2008125258 A2  * 10/2008

* cited by examiner

*Primary Examiner* — Stephen F Gerrity
(74) *Attorney, Agent, or Firm* — Global Patent Operation; Douglas D. Zhang

(57) ABSTRACT

A collection lip for a griddle is disclosed. The collection lip includes a longitudinally elongated body member having a first end, a second end, a lateral center line and a longitudinal side. The collection lip further includes a lip member extending from the longitudinal side away from the longitudinally elongated body member, the lip member including sides configured to direct cooking byproducts flowing across the lip member towards the lateral center line.

14 Claims, 6 Drawing Sheets

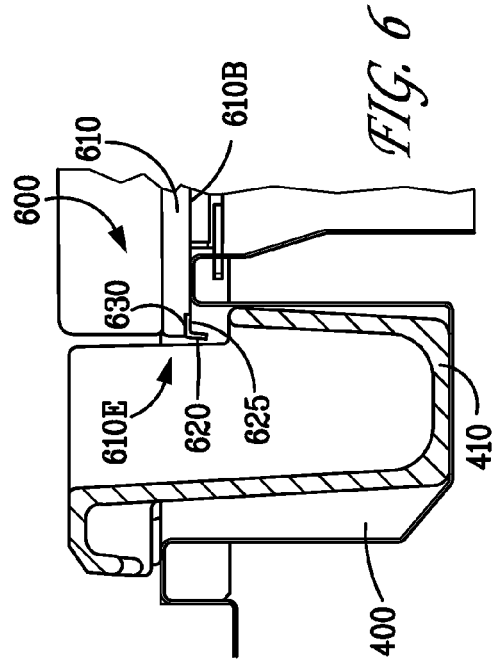
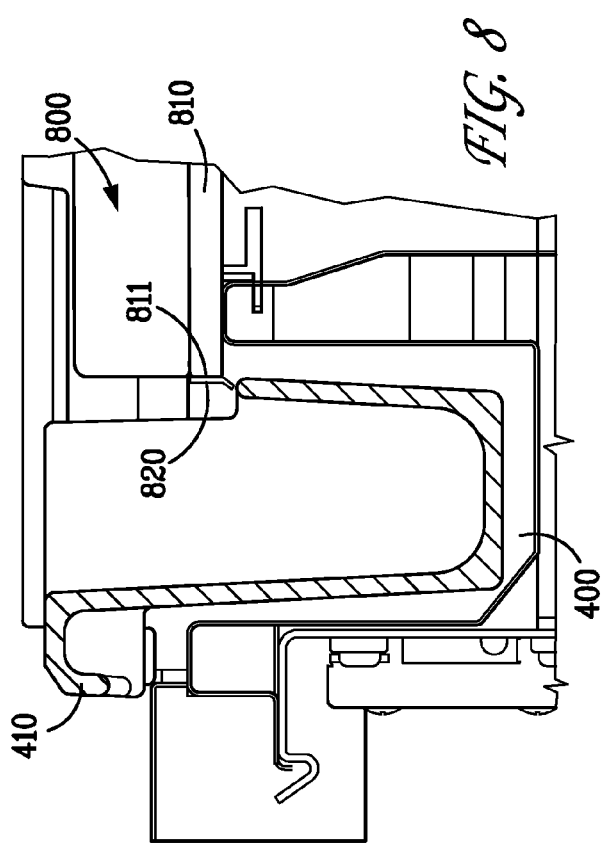
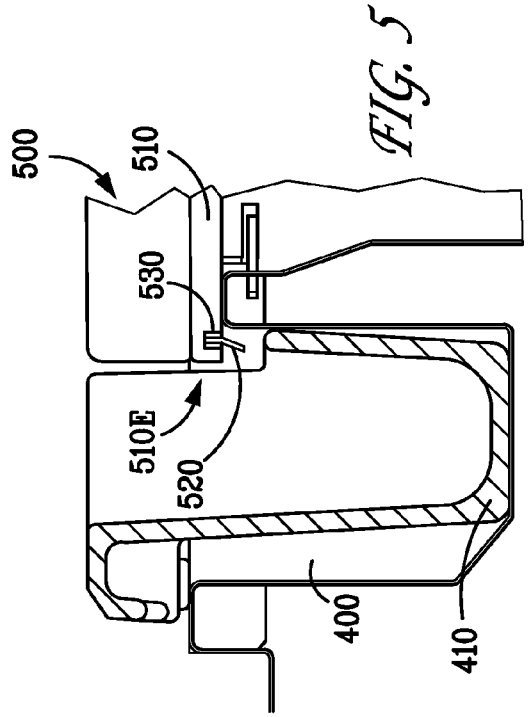
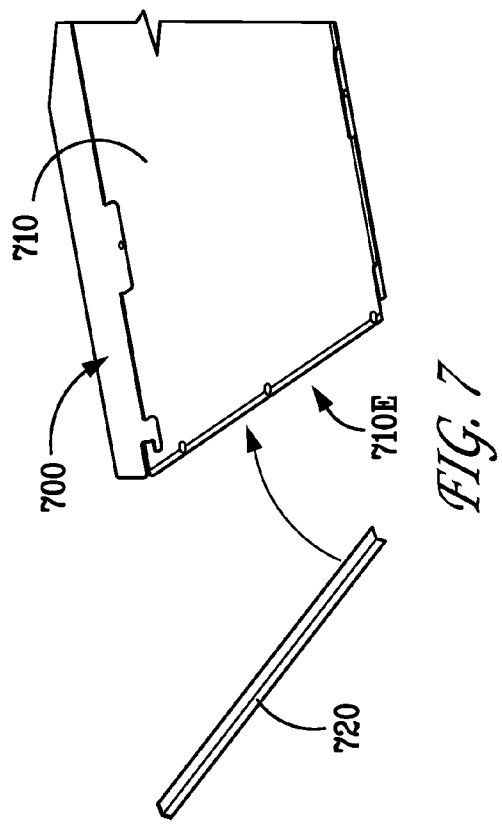

COOKING BYPRODUCT COLLECTOR

BACKGROUND OF THE INVENTION

The exemplary embodiments of the present invention generally relate to cooking appliances. More particularly, the exemplary embodiments relate to collectors for cooking byproducts.

Generally stove tops equipped with a griddle include a byproduct (e.g. grease, oil, etc.) collection area located along one or more sides of the griddle. These byproduct collection areas generally include, for example a sump, which is generally not removable. Where the sump is built into the cooking appliance, a tube may connect the sump with a larger collection area such as a drawer or other container located, for example, remotely from the stove top (e.g. beneath the stove top). Where the byproduct collection area includes a sump, such as that noted above, that is not removable, it is difficult to remove the byproducts from the collection area. Cleaning the tube that connects the sump to a remote container is also difficult to clean as the tube generally runs along a path inside the stove that is inaccessible to a user.

Some conventional stove top griddles may be shaped to direct the byproducts into a removable trough that is located in, for example the sump area of the cooking appliance. However, not all of the byproducts flow into the trough and a significant portion of the byproducts end up flowing around the sides of the trough into the sump. The byproducts that flow into the sump are difficult to remove as noted above and also generally flow along the outside of the trough making the surface of the trough slippery to the touch, which may make removal of the trough from the sump difficult. In addition, the byproducts located on the outer surface of the trough provide additional surfaces that must be cleaned by the user.

BRIEF DESCRIPTION OF THE INVENTION

As described herein, the exemplary embodiments overcome one or more of the above or other disadvantages known in the art.

One aspect of the exemplary embodiments relates to a collection lip for a griddle. The collection lip includes a longitudinally elongated body member having a first and second end, a lateral center line and a longitudinal side, and a lip member extending from the longitudinal side away from the longitudinally elongated body member, the lip member including sides configured to direct cooking byproducts flowing across the lip member towards the lateral center line.

Another aspect of the exemplary embodiments relates to a griddle for a cooking appliance. The griddle includes a griddle plate having an open side, one or more side walls affixed to the griddle plate, and a collection lip affixed to the open side of the griddle plate, the collection lip including a longitudinally elongated body member having a first and second end, a lateral center line and a longitudinal side, and a lip member extending from the longitudinal side away from the longitudinally elongated body member, the lip member including sides configured to direct cooking byproducts flowing from the open side and across the lip member towards the lateral center line.

Still another aspect of the exemplary embodiments relates to a cooking appliance. The cooking appliance including a frame, a griddle body mounted to the frame, a cooking byproduct collection device mounted to the frame, and a griddle configured to be placed on the griddle body, the griddle including a collection lip affixed to an open side of the griddle, the collection lip comprising, a longitudinally elongated body member having a first and second end, a lateral center line and a longitudinal side, and a lip member extending from the longitudinal side away from the longitudinally elongated body member, the lip member including sides configured to direct cooking byproducts flowing from the open side of the griddle and across the lip member towards the lateral center line for collection in the byproduct collection device.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein. In addition, any suitable size, shape or type of elements or materials could be used.

BRIEF DESCRIPTION OF THE DRAWINGS

In the drawings:

FIGS. 5 through 8 are schematic illustrations of griddles including byproduct collection lips in accordance with exemplary embodiments.

DETAILED DESCRIPTION OF THE EXEMPLARY EMBODIMENTS OF THE INVENTION

Figure 1:
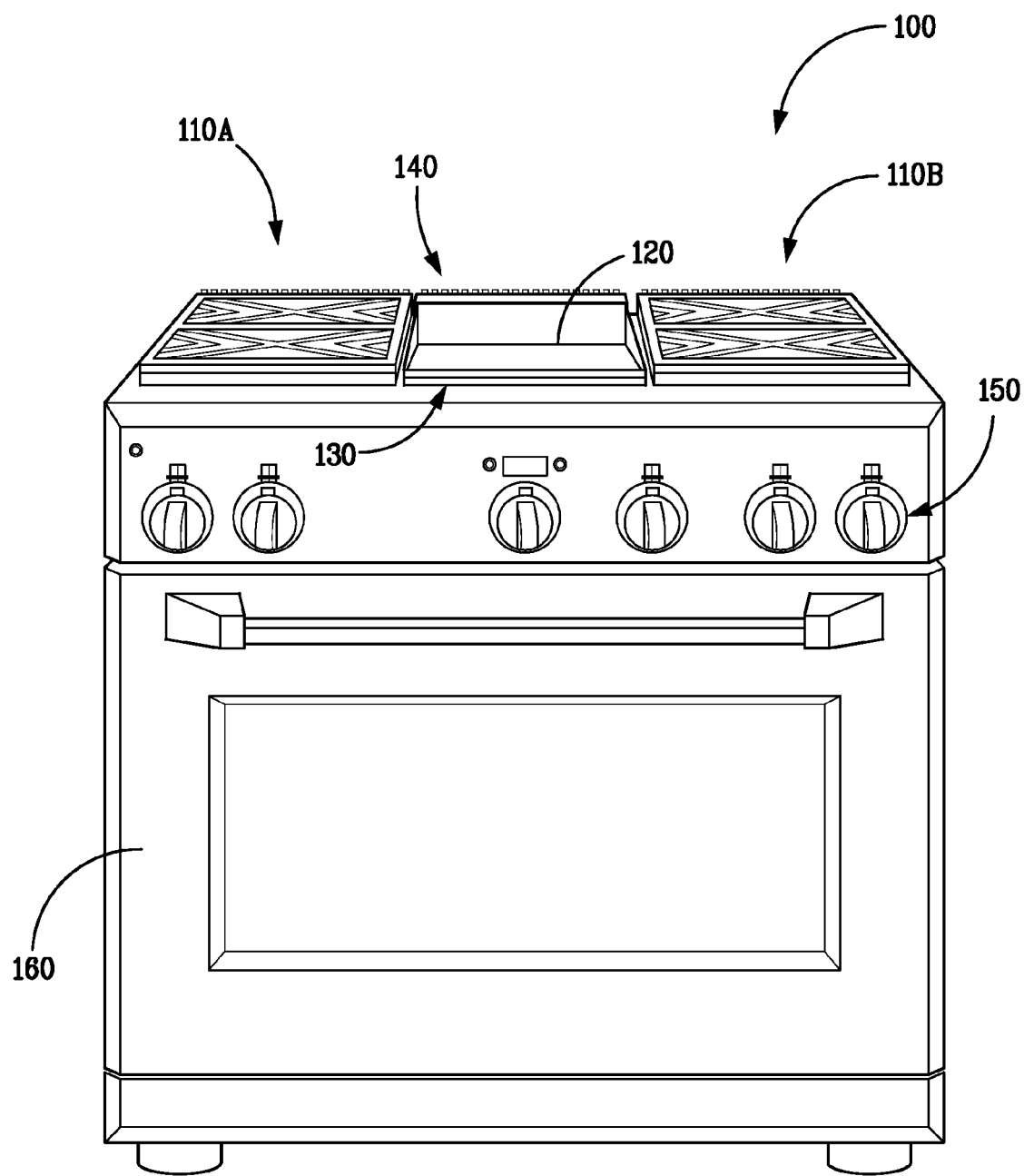
FIG. 1 is a schematic illustration of an exemplary appliance incorporating features of an exemplary embodiment.

FIG. 1 illustrates an exemplary appliance 100 in accordance with an exemplary embodiment. In this example the appliance 100 is shown as a cooking range but in alternate embodiments the appliance may be, for example, any other suitable cooking appliances including but not limited to cabinet mounted cook tops and portable grilling units. The appliance 100 may include, as a non-limiting example, a cook top 140 having two or more surface heating elements 110A, 110B, an oven 160, and one or more control knobs 150 (and/or corresponding switches) for controlling the surface heating elements 110A, 110B and/or other suitable features of the appliance 100. The surface heating elements 110A, 110B may be any suitable heating elements such as, for example, gas or electric heating elements.

The appliance 100 may also include a griddle 120 and a cooking byproduct collection area 130 for collecting, for example, grease or other cooking byproducts (e.g., oils and other fluids) produced while grilling foods on the griddle 120. As will be described in greater detail below, the griddle 120 includes a collection lip 200 (FIGS. 2A and 2B) configured to direct the byproducts into, for example, a collection device such as a removable trough 410 (FIG. 4A) located in a sump

400 (FIG. 4A) of the byproduct collection area 130. The configuration of the collection lip 200 is such that substantially all of the byproducts produced while cooking on the griddle 120 are directed into, for example, the trough 410, leaving the sump 400 and the inside of the griddle body 420 (FIG. 4) substantially free of cooking byproducts.

Figure 2A:
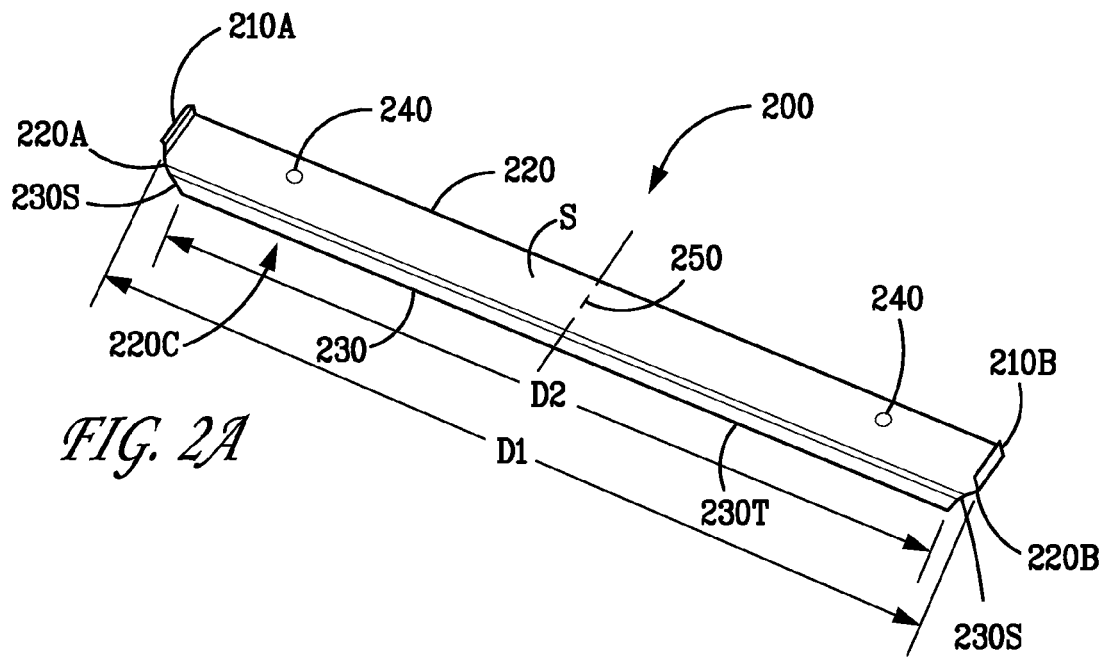
FIG. 2A is a schematic illustration of byproduct collection lip in accordance with an exemplary embodiment.
Figure 2B:
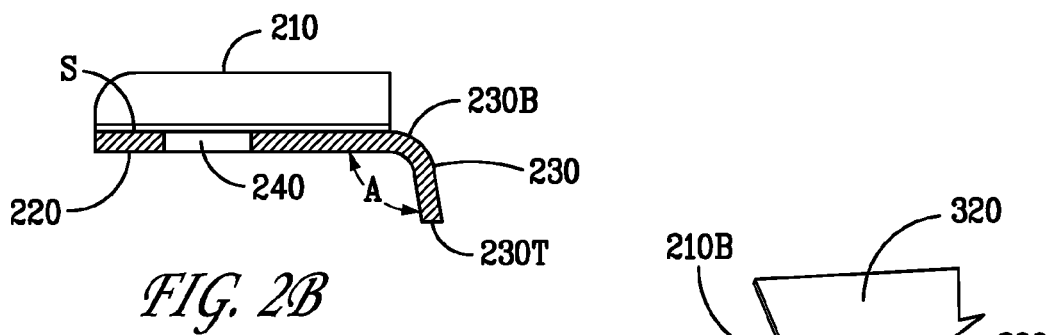
FIG. 2B is a cross-sectional view of the byproduct collection lip of FIG. 2A in accordance with an exemplary embodiment.

Referring to FIGS. 2A and 2B, the collection lip 200 will be described in accordance with an exemplary embodiment. In this example, the collection lip 200 includes a longitudinally elongated body member 220 having a length D1, a lateral centerline 250, a first end 220A and a second end 220B. Each of the first and second ends 220A, 200B has a respective side member 210A, 210B extending therefrom in a first direction away from the body member 220. As can be seen in FIG. 2A, in this example, the side members 210A, 210B are substantially orthogonal to surface S of the body member 220. In other examples the side members 210A, 210B may have any suitable angular relationship with the body members 220. A lip member 230 extends from a side 220C of the body member 220 in a second direction generally opposite the first direction. As can be seen in FIG. 2B, the lip member 230 extends away from the body member 220 at angle A. For exemplary purposes only, the angle A may be any angle suitable for directing the cooking byproducts into the trough 410 (FIG. 4A) as described below. As a non-limiting example, in one exemplary embodiment the angle A is an obtuse angle that may be about 95 degrees. In other example, the angle A may be more or less than 95 degrees. For explanatory purposes only, the portion of the lip member 230 that joins the lip member 230 to the body member 220 will be referred to as the base of the lip member 230B. The base of the lip member 230B may have a length substantially equal to the length D1 of the body member 220. The lip member 230 has a tip 230T located opposite the base 230B such that the tip 230T has a length D2 which is less than the length D1 of the base 230B (or body member 220) such that sides 230S of the lip member 230 are angled or curved towards the lateral centerline 250. The angled or curved sides 230S of the lip member 230 are configured such that cooking byproducts flowing along the lip member 230 flowingly adhere to the sides 230S (e.g. the byproducts do not separate or drip from the angled or curved sides when flowing down the lip member). As can be seen in FIGS. 2A and 3B, where the sides 230S are curved, the curve is a convex curve (e.g., it is radiused outward) relative to the lip member 230. In alternate embodiments the curve may be a concave curve (e.g. radiused inwards) or the sides 230S each may have a straight edge. It is noted that in one example, the collection lip 200 may have a unitary one-piece construction and be formed from a single piece of material. In other examples the collection lip 200 may be constructed of any suitable number of pieces joined together in any suitable manner. The body member 220 of the collection lip 200 may also include one or more holes 240 for allowing coupling of the collection lip 200 to, for example, the griddle plate 310 of the griddle 300 with any suitable fasteners 330 (FIG. 3A) as will be described below.

Figure 3A:
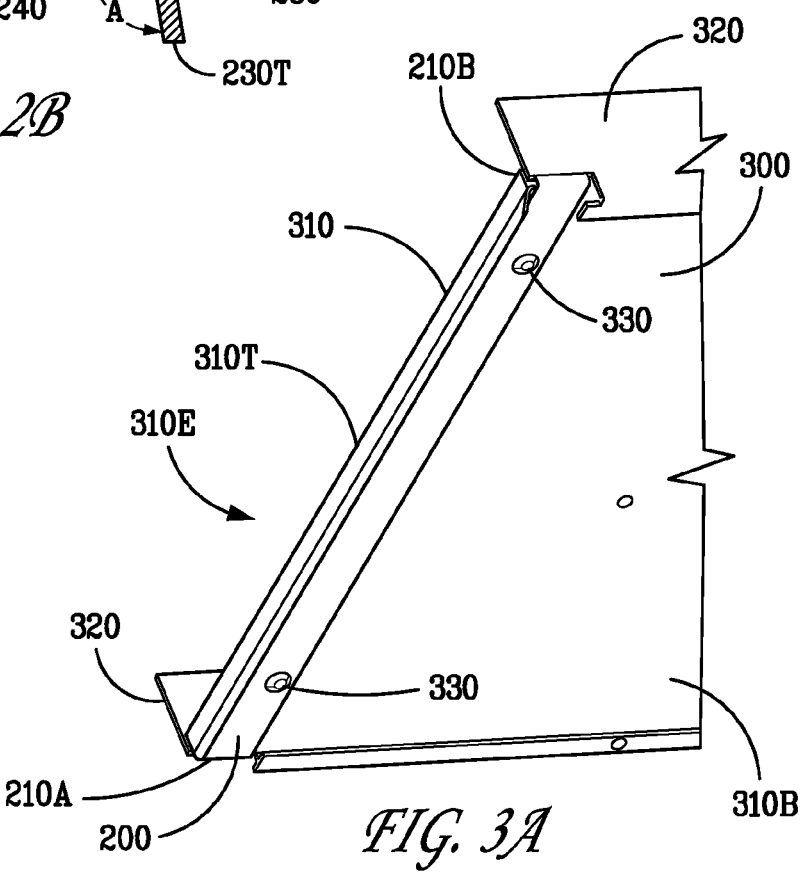
FIGS. 3A-3C are schematic illustrations of a griddle including a byproduct collection lip in accordance with an exemplary embodiment.
Figure 3B:
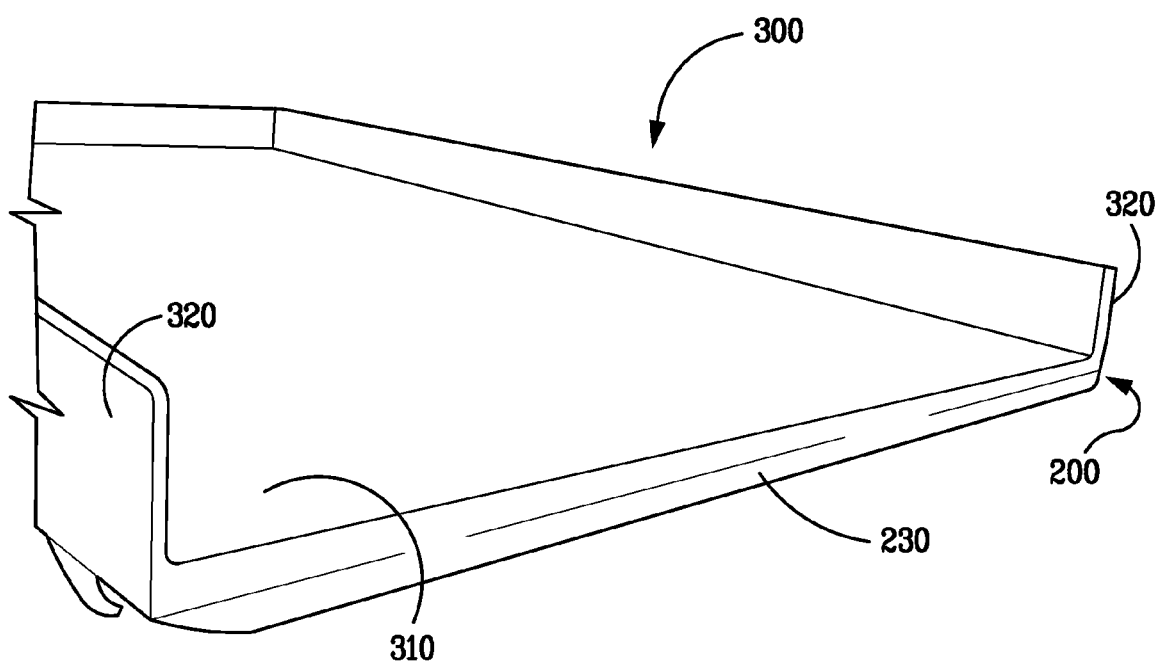
Figure 4A:
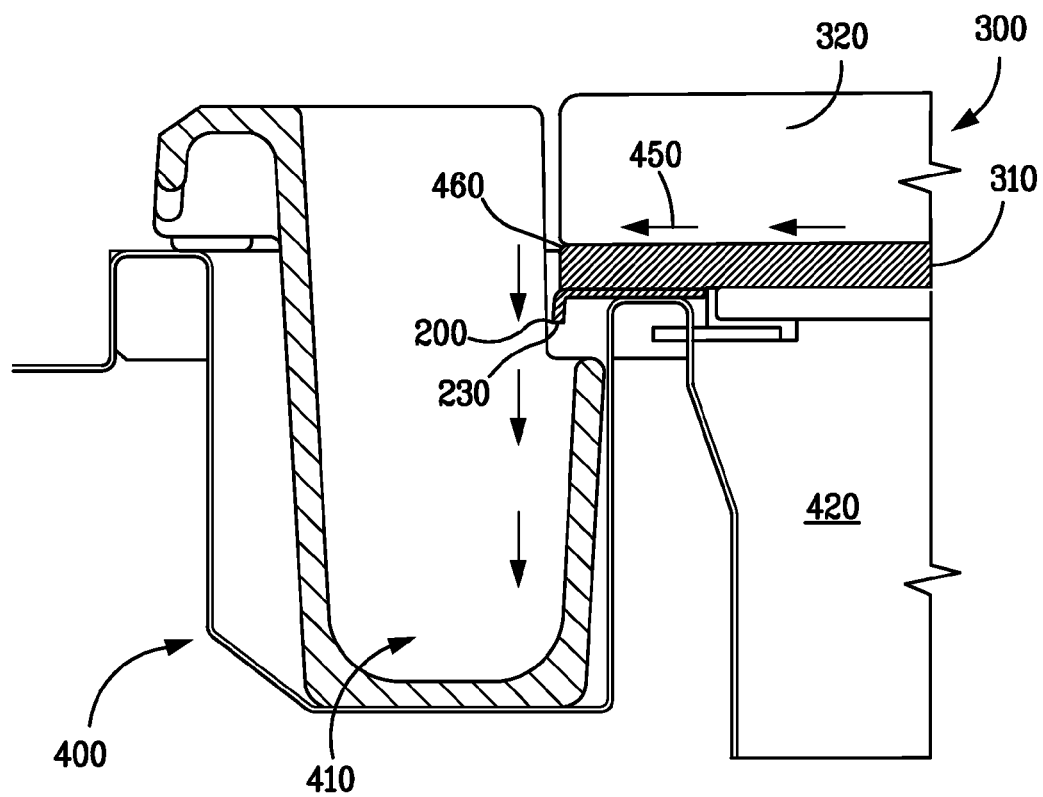
FIGS. 4A and 4B are schematic illustrations of a flow of cooking byproducts in accordance with an exemplary embodiment.

Referring now to FIGS. 3A and 3B, the griddle 300, which may be substantially similar to griddle 120, includes a griddle plate 310 and a griddle body 420 (FIG. 4A). The griddle body 420 is configured to house one or more griddle burners. The griddle plate 310 is configured to be placed on the griddle body 420 and includes, for example, side walls 320 attached to the griddle plate 310 for containing cooking byproducts on the griddle plate 310. In this example, the side walls 320 are located along three sides of the griddle plate 310 and extend away from a top surface 310T of the griddle plate 310. A fourth side of the griddle plate 310 is open to allow the cooking byproducts to escape into, for example, a removable trough or other suitable byproduct containment area or device. In alternate embodiments, the griddle plate may have any suitable number of sides and associated walls. The griddle plate 310 and side walls 320 may be joined together in any suitable manner such as by, for exemplary purposes only, welding so that the corners of the griddle 300 where the sides meet the griddle plate 310 are substantially seamless as shown in FIG. 3B to prevent food byproducts from collecting and/or passing between the griddle plate 310 and sides 320. In alternate embodiments the griddle plate and side walls may have a unitary construction and be formed in a single piece. As can be seen in the figures, the side walls 320 are affixed to three sides of the griddle plate 310 so that the cooking byproducts are allowed to escape the griddle 300 along only the open side 310E of the griddle plate 310.

Figure 3C:
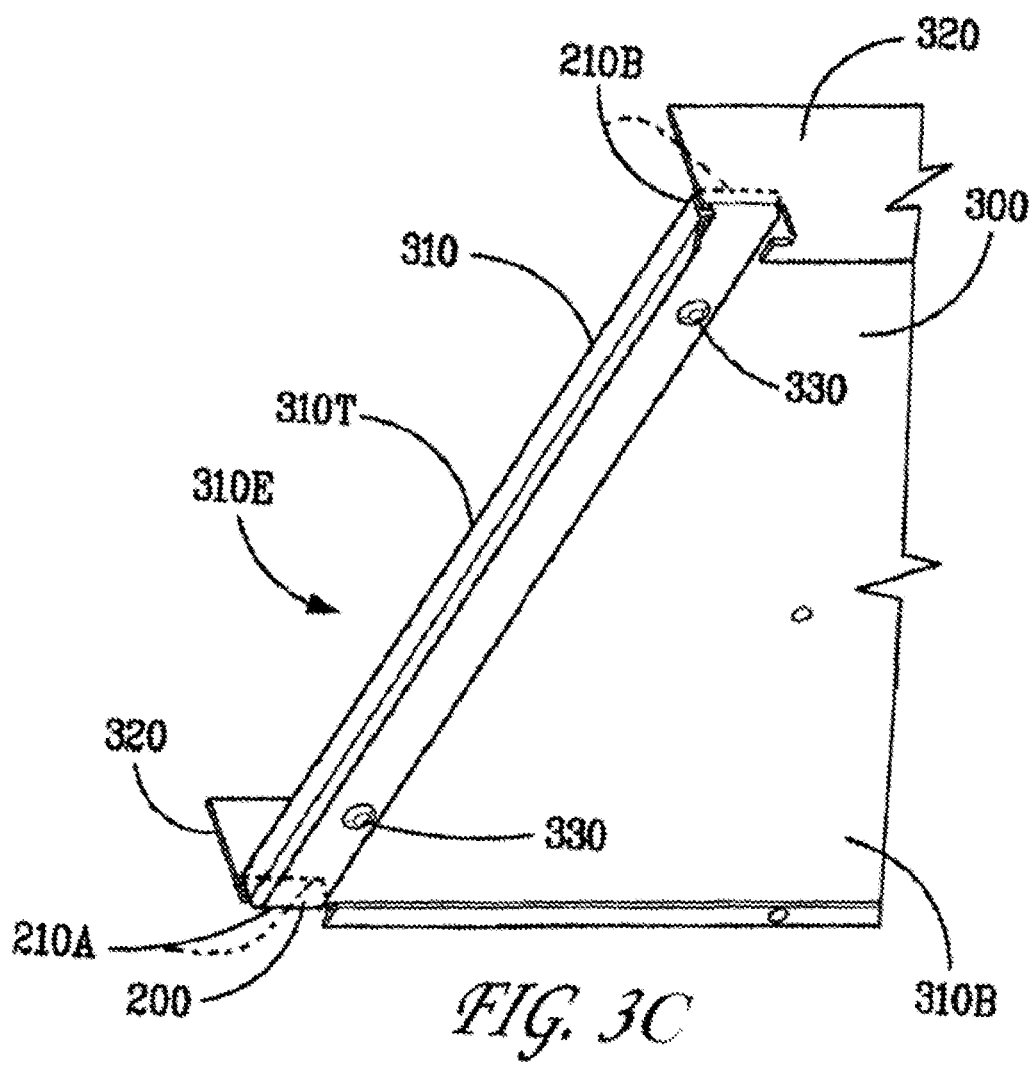

As can be seen in FIG. 3A, the collection lip 200 may be affixed to the open side 310E of the griddle plate 310 in any suitable manner so that the lip member 230 substantially extends from an edge of the open side 310E of the griddle plate 310 for directing the cooking byproducts that escape the griddle 300 into, for example, a trough or other suitable cooking byproduct containment area or device. As can be seen in FIG. 3A, the side to affix the collection lip 200 to the griddle plate is the surface S of the collection lip 200, which is placed in substantial contact with, for example, a bottom side of the griddle plate 310. The side members 210A, 210B of the collection lip 200 are configured to wrap around corresponding edges of the griddle plate 310 (See, for example, FIG. 3C). The side members 210A, 210B may be configured to be inserted between the corresponding edges of the griddle plate 310 and the side walls 320 as shown in FIG. 3A. In alternate embodiments the side members 210A, 210B may be configured to wrap around a corresponding portion of the side walls such that the corresponding portion of the side walls are located between the corresponding edge of the griddle plate 310 and the side members 210A, 210B. In one example, the collection lip 200 may be affixed to the griddle plate 310 with, for example, suitable fasteners 330. In another example, the fasteners 330 may provide a temporary attachment of the collection lip 200 to the griddle plate 310 to allow for welding the collection lip 200 to the griddle plate 310 along at least the open side 310E. The side members 210A, 210B of the collection lip 200 may also be welded to the corresponding edges of the griddle plate 310. Where the collection lip 200 is welded to the griddle plate the welds are substantially smooth, as shown in FIG. 3B, so that there are substantially no cooking byproduct collection areas (e.g. bumps, ridges, or other obstructions) that would cause the cooking byproducts to separate from the collection lip 200 before reaching the tip 230T of the collection lip 200.

Figure 4B:
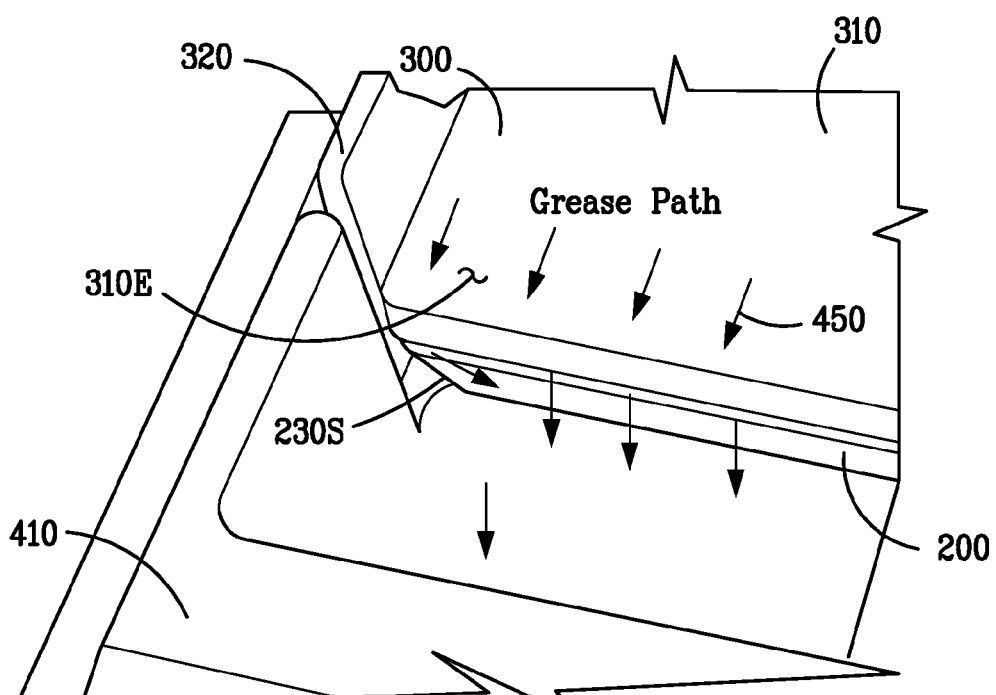

Referring now to FIGS. 4A and 4B, the flow 450 of cooking byproducts along the collection lip will be described. As cooking byproducts are generated during the cooking process, the byproducts may flow or be directed towards the open side 310E of the griddle plate 310. The byproducts flow over the edge 460 of open side 310E, towards the collection lip 200. The byproducts flow towards the tip 230T of the collection lip 200 where the byproducts collect and drip (or flow) into the trough 410 or other byproduct collection device. As the byproducts flow towards the tip 230T, the byproducts flowing along the sides 230S of the collection lip 200 are directed inwards along the sides 230S (substantially without separation from the sides 230S) towards the lateral centerline 250 of the collection lip 200 and away from the edges of the trough 410 and sump 400. Directing the cooking byproducts away from the edges of the trough 410 and sump 400 effects dripping or flowing of the byproducts from the tip 230T into an interior portion of the trough 410 such that the byproducts do not escape over the edges of the trough 410 into the sump 400.

Referring to FIGS. 5-8, other examples of a collection lip in accordance with exemplary embodiments are shown. In one exemplary embodiment, as shown in FIG. 5, the griddle 500 (which is substantially similar to the griddle 120 unless otherwise noted) may include a griddle plate 510 having one or more holes 530 adjacent the open side 510E. The collection lip 520 (which is substantially similar to the collection lip 200 unless otherwise noted) may be fit into the one or more holes for directing cooking byproducts from the one or more holes 530 into the trough 410 in a manner substantially similar to that described above with respect to FIGS. 4A and 4B.

In another exemplary embodiment, as can be seen in FIG. 6, the griddle 600 (which is substantially similar to the griddle 120 unless otherwise noted) may include a griddle plate 610 having a recess 630 located in a bottom surface 610B adjacent the open side 610E of the griddle plate 610. The recess 630 may be configured to receive a corresponding part, such as the elongated body member 625 (similar to body member 220), of the collection lip 620 (which is substantially similar to the collection lip 200 unless otherwise noted). The collection lip 620 directs cooking byproducts into the trough 410 in a manner substantially similar to that described above with respect to FIGS. 4A and 4B.

As can be seen in FIG. 7, in accordance with another exemplary embodiment, the griddle 700 (which is substantially similar to the griddle 120 unless otherwise noted) includes a griddle plate 710. The collection lip 720 (which is substantially similar to the collection lip 200 but does not include the side members 210A, 210B) may be, for example, affixed to the open side 710E of the griddle plate 710 for directing cooking byproducts into the trough 410 in a manner substantially similar to that described above with respect to FIGS. 4A and 4B.

As can be seen in FIG. 8, in accordance with another exemplary embodiment, the griddle 800 (which is substantially similar to the griddle 120 unless otherwise noted) includes a griddle plate 810. The collection lip 820 (which is substantially similar to the collection lip 200 unless otherwise noted) is configured to attach to a side surface 811 of the griddle plate 810. The collection lip 820 directs cooking byproducts into the trough 410 in a manner substantially similar to that described above with respect to FIGS. 4A and 4B.

It is noted that the collection lips shown in FIGS. 5-8 may be affixed to the respective griddle plates in any suitable manner such as with fasteners or welds as described above with respect to the collection lip 200.

The collection lips and griddles described herein provide for substantially all of the cooking byproducts produced while cooking on the griddle, such as griddle 120, being directed into a removable container located substantially below the collection lip substantially preventing cooking byproducts from entering the sump 400 and griddle body 420. The configuration of the collection lips reduces the amount of cleaning needed to remove byproducts from the byproduct collection area. The configuration of the collection lips also keeps the byproducts away from the surface heating elements located within the griddle body 420.

Thus, while there have been shown and described and pointed out fundamental novel features of the invention as applied to the exemplary embodiments thereof, it will be understood that various omissions and substitutions and changes in the form and details of devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A collection lip comprising:
a longitudinally elongated body member comprising a first end, a second end, a lateral center line and a longitudinal side;
a lip member extending from the longitudinal side away from the longitudinally elongated body member, the lip member comprising sides configured to direct cooking byproducts flowing across the lip member towards the lateral center line;
a first side member extending from the first end away from the longitudinally elongated body member; and
a second side member extending from the second end away from the longitudinally elongated body member,
wherein the first side member and the second side member are configured to wrap around respective edges of a griddle.

2. The collection lip of claim 1, wherein the lip member includes a base and a tip, a length of the base being greater than a length of the tip so that the sides of the lip member have a curved or angled configuration.

3. The collection lip of claim 1, wherein the lip member extends from the longitudinal side at an obtuse angle relative to the longitudinally elongated body member.

4. The collection lip of claim 1, wherein the first side member and the second side member extend substantially orthogonally away from the longitudinally elongated body member.

5. A griddle for a cooking appliance, comprising:
a griddle plate comprising an open side;
one or more side walls affixed to the griddle plate; and
a collection lip affixed to the open side of the griddle plate, the collection lip comprising:
a longitudinally elongated body member comprising a first end, a second end, a lateral center line and a longitudinal side;
a lip member extending from the longitudinal side away from the longitudinally elongated body member, the lip member comprising sides configured to direct cooking byproducts flowing from the open side and across the lip member towards the lateral center line;
a first side member extending from the first end away from the longitudinally elongated body member; and
a second side member extending from the second end away from the longitudinally elongated body member,
wherein the first side member and the second side member are configured to wrap around respective edges of the griddle plate.

6. The griddle of claim 5, wherein the lip member includes a base and a tip, a length of the base being greater than a length of the tip so that the sides of the lip member have a curved or angled configuration.

7. The griddle of claim 5, wherein the lip member extends from the longitudinal side at an obtuse angle relative to the longitudinally elongated body member.

8. The griddle of claim 5, wherein the first and second side members extend substantially orthogonally away from the longitudinally elongated body member.

9. The griddle of claim 5, wherein the collection lip is welded to the griddle plate.

10. A cooking appliance comprising:
   a frame;
   a griddle body mounted to the frame;
   a cooking byproduct collection device mounted to the frame; and
   a griddle configured to be placed on the griddle body the griddle including a collection lip affixed to an open side of the griddle, the collection lip comprising:
      a longitudinally elongated body member comprising a first end, a second end, a lateral center line and a longitudinal side; and
      a lip member extending from the longitudinal side away from the longitudinally elongated body member, the lip member comprising sides configured to direct cooking byproducts flowing from the open side of the griddle and across the lip member towards the lateral center line for collection in the byproduct collection device;
      a first side member extending from the first end away from the longitudinally elongated body member; and
      a second side member extending from the second end away from the longitudinally elongated body member,
      wherein the first side member and the second side member are configured to wrap around respective edges of the griddle.

11. The cooking appliance of claim 10, wherein the lip member includes a base and a tip, a length of the base being greater than a length of the tip so that the sides of the lip member have a curved or angled configuration.

12. The cooking appliance of claim 10, wherein the lip member extends from the longitudinal side at an obtuse angle relative to the longitudinally elongated body member.

13. The cooking appliance of claim 10, wherein the first side member and the second side member extend substantially orthogonally away from the longitudinally elongated body member.

14. The cooking appliance of claim 10, wherein the collection lip is welded to the griddle.

* * * * *